Feb. 19, 1952 F. R. NUCKOLS 2,586,174

TURNTABLE DRIVE

Filed Dec. 14, 1948 2 SHEETS—SHEET 1

INVENTOR.
Frank R. Nuckols
BY
W. Douglas
Atty.

Feb. 19, 1952 F. R. NUCKOLS 2,586,174

TURNTABLE DRIVE

Filed Dec. 14, 1948 2 SHEETS—SHEET 2

INVENTOR.
Frank R. Nuckols
BY
J. D. Douglas
Att'y

Patented Feb. 19, 1952

2,586,174

UNITED STATES PATENT OFFICE 2,586,174

TURNTABLE DRIVE

Frank R. Nuckols, Mundelein, Ill.

Application December 14, 1948, Serial No. 65,159

12 Claims. (Cl. 74—190)

This invention relates to drive mechanism for the turntable of a phonograph and more specifically to improved mechanism by which motion, provided at a constant rate by a motive unit, is adapted to operate the turntable at either of two speeds.

Many devices have been proposed to accomplish the two speed operation of a turntable for a phonograph. Some use a two-speed motor which is an expensive device, particularly when the speeds must be odd values, such as 78.3 and 33⅓ revolutions per minute. Another method of accomplishing two-speed operations is the use of gear trains and either shifting from one to another in the manner of an automobile transmission or using alternate clutch devices to engage the separate trains. This again is an expensive device to manufacture, and in addition may be noisy and cumbersome and difficult to shift.

By my invention, I provide a device which is inexpensive, since it uses only one single speed motor and no expensive gears. It is also quiet, since there are no gears which may growl. And at the same time, my device is easy to shift.

Other advantages of the invention will be set forth in part hereinafter and in part will be obvious herefrom, or may be learned by practice with the invention, the same being realized and attained by means of the instrumentalities and combinations pointed out in the appended claims.

The accompanying drawings, referred to herein and constituting a part hereof, illustrate one embodiment of the invention and together with the description serve to explain the principles of the invention.

In the drawings:

Fig. 1 is a fragmentary top plan view of a record player showing the invention, the mechanism thereof being in adjustment for operating the turntable at a speed of 78 R. P. M.;

Fig. 2 is a view of a mechanism shown in Fig. 1, in side elevation;

Fig. 3 is a view corresponding to the view indicated in Fig. 1, the mechanism being in adjustment for operation of the turntable at a speed of 33⅓ R. P. M.

Fig. 4 is a fragmentary view of one of the idler wheels, in section, showing means for driving the same when the turntable is being driven at 78 R. P. M.;

Fig. 5 is a vertical section taken on line 5—5 of Fig. 3 showing the idler depicted in Fig. 4 in side elevation, in selective association with other rotatable elements which provide for a turntable speed of 33⅓ R. P. M.;

Figure 1:
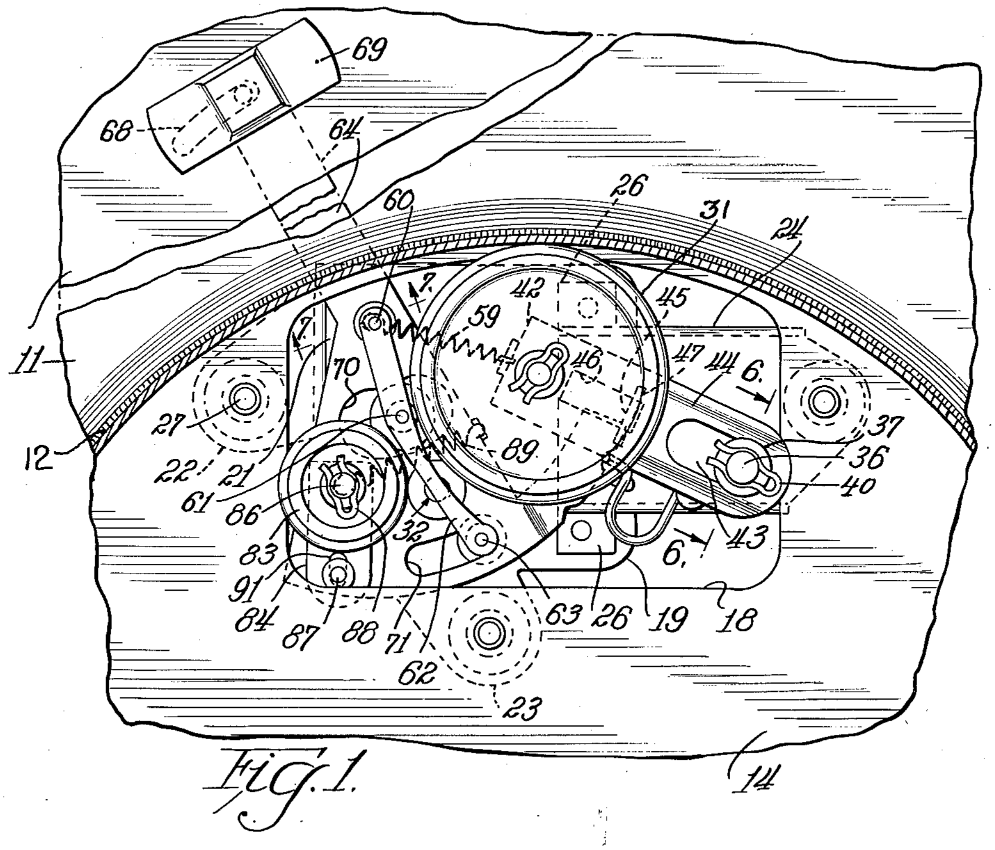

In connection with my improved drive mechanism, the reference character 11 is used throughout the drawings to denote a frame or base plate for a record player while 12 indicates a turntable operatively mounted on the base plate by means not shown. In keeping with common construction, the plate 11 is distended at 13 to provide an offset horizontal wall 14 thereby defining, in part, a well 16 adapted to accommodate a flange 17 depending peripherally of the turntable 12. The wall 14 has an aperture 18, therein, the purpose and significance of which will be apparent hereinafter. Below the aperture 18, a motor 19 is supported in any suitable manner.

In the construction, as disclosed, the motor 19 has affixed thereto a bracket 21 from which offset arms 22 and 23 extend, while an additional bracket 24 includes feet 26, offset therefrom, and rigidly connected to the motor 19 in any suitable manner. The motor 19 is preferably secured to the wall 14 by screws 27 passing through the arms 22, 23, and bracket 24 and threaded in the wall 14, rubber bushings 28 being used to insulate the base plate against possible vibrations created by the motor 19.

The turntable 12 is driven by a drive shaft 29, extending upward from the motor 19, through an idler 31 concurrently in engagement with the shaft 29 and flange 17. This is the manner in which motion from the motor 19 is communicated to the turntable 12 when the turntable is operated at a speed of 78.26 R. P. M., as when conventional or coarse grooved records are played. The idler 31 is floatingly supported in order that it may effectively engage the flange 17 and be in engagement with the drive shaft 29 and/or a second idler 32, later to be referred to. This is provided by means including a post 33, extending upwardly from bracket 24. The post 33 (Fig. 6) has a shoulder 34 thereon, a result of a reduction in diameter thereof, to provide a section or stem 36 on which a hub 37, of a bracket member 38, is journalled, being held therein by a spring lock 40 disposed in a groove. More specifically, the hub 37 also includes a section 39 which, by its reduction in diameter, affords a shoulder 41. The section 39 is rigidly fastened to the bracket member 38 between which and the shoulder 41 a carrier member 42 is confined against displacement thereof axially of a post but enabled to slide transversely of the post owing to a slot 43, in the carriage member, through which the section 39 extends. To facilitate ease of movement thereof with respect to bracket member 38, the carrier member may be provided with a pair of ribs 44 extending longitudinally thereof and adapted to not only provide bearing surfaces in engagement with the bracket 38 but to space the carrier member, generally, therefrom so that lubricant may be more readily retained between these adjacent parts. To retain the carrier member 42 against displacement laterally with respect to the bracket 38, said bracket bears at one end thereof a lug 45 extending upwardly through a slot 46 (Figs. 1 and 4) in the carrier member 42 above which the lug 45 includes laterally extending fingers 47 as additional means to retain the carrier member in operative association with the bracket member.

Figures 2, 7:
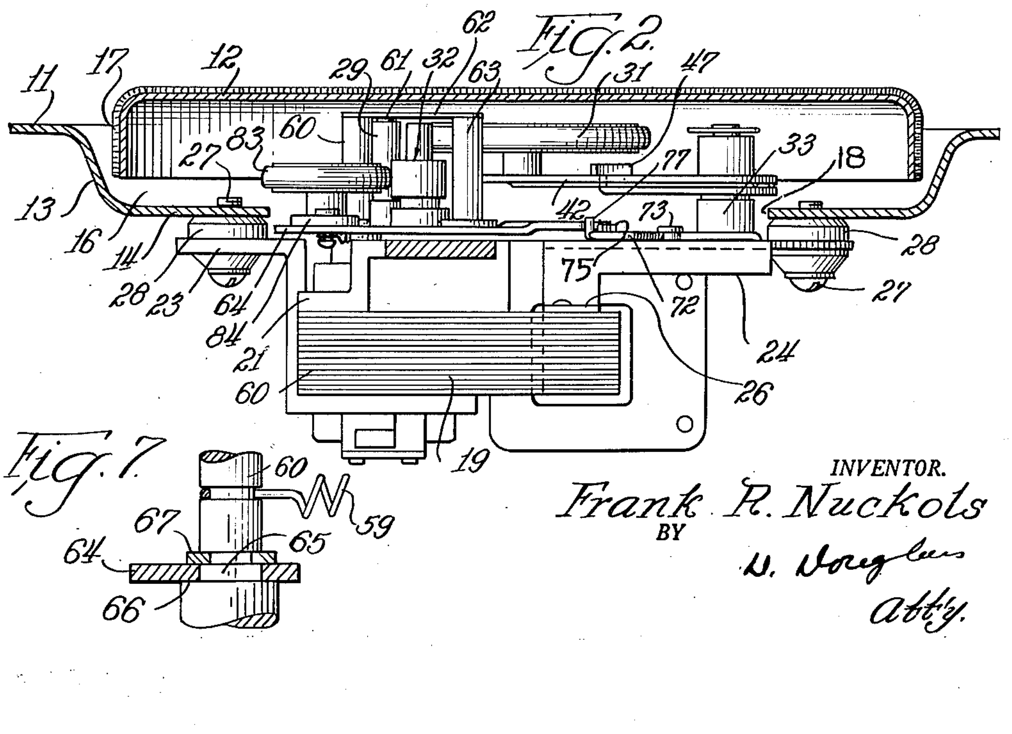
Fig. 7 is a vertical section taken on line 7—7 of Fig. 1.

The idler wheel 31 includes a composite web 50 provided by separate web members 48 and 49 held together by any suitable means. In addition, the web member 48 includes a peripherally offset portion 51 between which and the web member 49 a rubber tire 52 is confined. For its relationship with the carrier member 42, the wheel 31 includes a hub 53, extending downwardly, journalled on a pin 54 supported by and extending upward from said carrier member. If desired, a bearing washer 56 may be employed to space the hub 53 from member 42 while a washer 57, on the upper end of pin 54, and a split ring 58 seated in a groove in said pin, above washer 57, restrain the wheel 31 against upward displacement. The idler wheel 31 is urged into frictional engagement with the shaft 29 and the turntable flange 17 by a tension spring 59 (Figs. 3, 4, and 7) anchored to the carrier member 42 and a post 60 on the motor 19.

The drive shaft 29 of motor 19 which extends outboard from the motor is provided with a tip 61, of reduced diameter. This tip passes through a strap or bridge member 62 (Figs. 1 and 4) rigidly fastened to the ends of post 60 and a second post 63 rigidly mounted on the arm 23 thus providing support for the otherwise free end of the shaft.

A mobile train of rotatable elements is employed to provide a second and slower speed for the turntable when fine or microgrooved records are reproduced. Briefly, the speed of the turntable is thus changed by displacing the idler 31 from engagement with the drive shaft 29 without removing the idler from its driving association with the turntable flange 17 while concurrently, the mobile train is moved into engagement between the drive shaft and idler 31. The mechanism for carrying this into effect includes a swingable support member or control lever 64 journalled on and adapted to swing about the post 60. So that this may be effected, the post 60 (Fig. 7) includes a portion 65, of reduced diameter passing through lever 64. A shoulder 66 is thus provided between which and a U-washer 67, grasping the portion 65, the lever 64 is confined against displacement axially of the post. Besides extending away from the post 60, the lever 64 extends upwardly through an aperture 68 in the base plate 11 above which the lever bears a handle 69 by which the speed for the turntable may be selected. The other end of the lever extends past the motor drive shaft 29, the lever being provided with an aperture 70, to allow pivotal movement of said lever without interference with the drive shaft. Additionally, the lever 64 is apertured with a slot 71 also to provide for pivotal movement of the lever without interference with the post 63 which extends through slot 71.

The lever 64 is adapted to be swung between two predetermined positions in each of which the turntable is operated at a different speed. To provide for this, a suitable detent device may take the form of a spring member 72 (Fig. 3) which preferably is of resilient wire anchored to the bracket 24 by a screw 73 about which a tendency of the spring to turn is resisted by its proximity to the post 33 and further anchorage involving a hole 74, in bracket 24, in which the downward bent end of the spring is received. From the screw 73 the spring 72 extends in a curvilinear order, or U shape for the sake of resiliency, and has an outwardly extending part or neck 76, and is then bent upward to provide a vertically extending finger 77 adapted to ride on the surface 80′ of an arm 80 on the lever 64 and to engage either a notch 78 or a notch 79 in that surface. For operative relationship with the finger 77, the arm 80 includes a peripheral surface 80′ in the form of an arc of which the post 60 is the center, in which the notches 78 and 79 are disposed. The finger 77 is adapted to press against the peripheral surface 80′ of the arm and to impede movement of lever 64 when the finger engages one of the notches 78 or 79. To resist lateral displacement of the spring 72, the neck 76 is confined between a pair of lugs 75 struck upwardly from the bracket 24. The finger 77 engages notch 78 to hold the control lever 64 in a first position (Fig. 1) wherein the idler 31 is in driving engagement with the drive shaft 29 and turntable flange 17, the arrangement of parts when the turntable is rotated at a speed of 78.26 R. P. M. When the lever 66 is swung counterclockwise until notch 79 is engaged by the finger 77 (Fig. 3) the idler 31 is moved out of engagement with the drive shaft 29 to provide a turntable speed of 33⅓ R. P. M. by means now to be described.

As was previously stated, the control lever 64 carries a second idler 32. It embodies a step 81 (Fig. 5) adapted to engage the idler 31 from which the step 81 is spaced when the idler 31 is in engagement with the drive shaft 29. The idler 32 is preferably of metal and includes a second step 82 adapted to be drivingly engaged by a third idler 83 preferably having a rubber tire 85 at the periphery thereof.

For the support of the idler 83, special means is employed. It involves use of a mobile or floating link 84 having a pin 86 (Fig. 1) in upward extension from one end thereof while the opposite end is pivotally anchored to the lever 64 by a headed pin 87. The idler 83 is journalled on the pin 86 and retained thereon in any suitable manner such as by means of a resilient wire clip 88 grasping an annularly grooved end of the pin. In order that the idler 83 may be biased clockwise about pin 87, a tension spring 89 is anchored between the link 84 and a point on the lever 64 remote from the idler 83. Additionally, the pin 87 extends from the lever 64 through a slot 91 in the link 84 so that said link is slidable longitudinally thereof. This enables driving relationship between the idlers 83 and 32 to be maintained as they are moved into position to provide driving communication between the drive shaft and the turntable thereby rotated at a second speed of 33⅓ R. P. M.

Figures 3, 4, 5, 6:
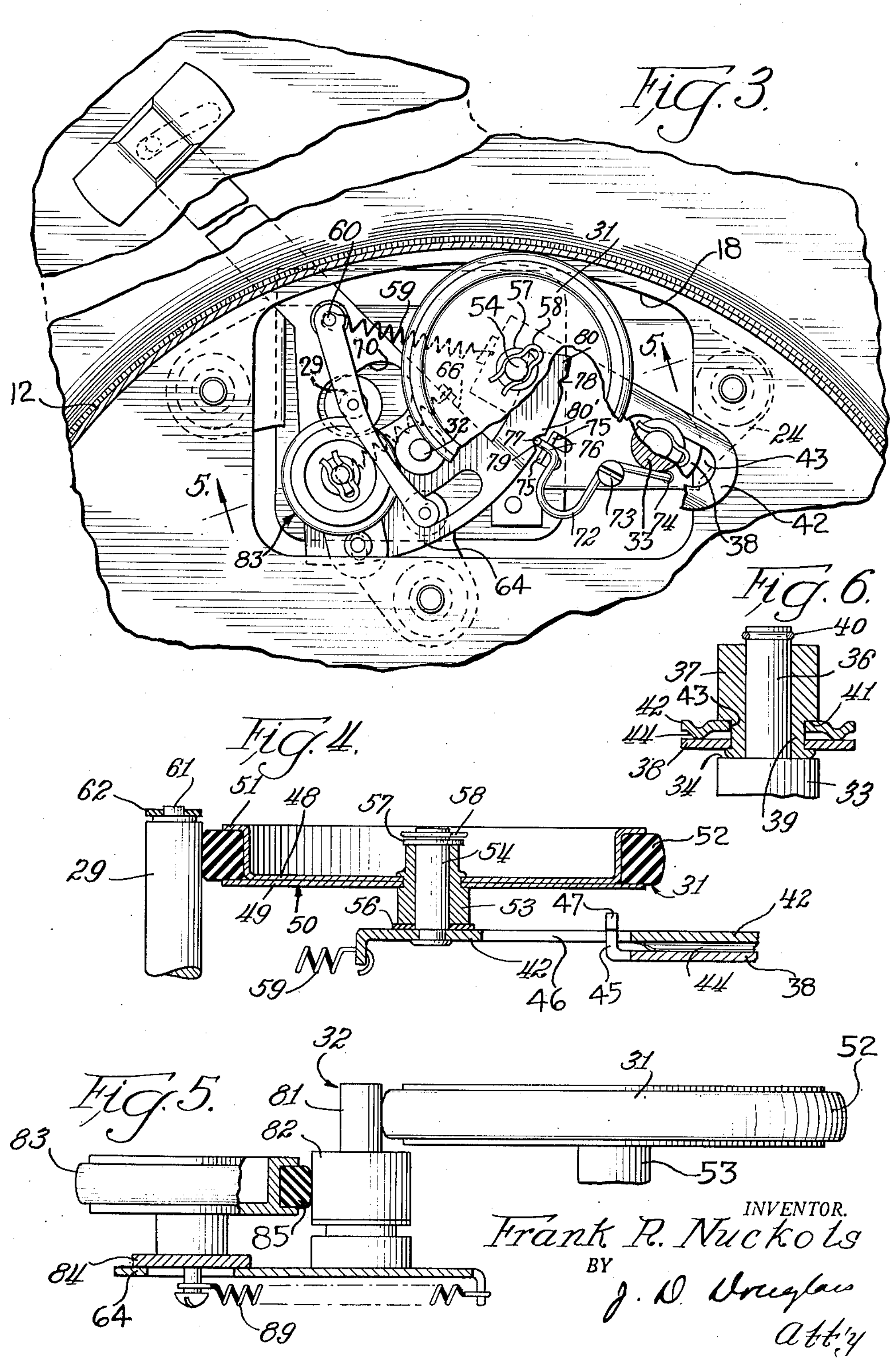
Fig. 6 is a vertical section taken on line 6—6 of Fig. 1.

As previously stated, Fig. 1 shows the mechanism set for 78 R. P. M. of the turntable, and Fig. 3 shows the mechanism set for 33⅓ R. P. M. When the control lever 64 is moved from the position in Fig. 1 to that of Fig. 3, the idler 32 is moved toward the idler 31. The portion 81 of the moving idler engages the periphery of the wheel 31 and moves it away from the motor shaft 29 at the same time the idler 83 is brought into contact with the motor shaft; and since it is already in driving contact with the idler 32, a drive at the reduced speed is effected from motor shaft 29 through idler 83 to the part 82 of idler 32, and from part 81 to the idler wheel 31, and thence to the turntable rim.

Having thus described my invention in an embodiment thereof, I am aware that numerous and extensive departures may be made therefrom without departing from the spirit or scope of my invention.

I claim:

1. In a phonograph record player comprising a turntable and a motor, means to provide for two-speed operation of the turntable from a single speed motor having a drive shaft including a first idler, means to associate said first idler floatingly with said motor, means to urge said first idler toward a position between said turntable and said drive shaft to provide a first speed for the turntable, shiftable means to provide a second speed for said turntable including a movable member in association with the motor, a second idler carried by said movable member, said second idler including two pulley surfaces differing in diameter, one of said pulley surfaces being adapted to engage said first idler drivingly and to move said first idler out of engagement with said drive shaft when said movable member is moved from a first to a second predetermined position, a third idler, means to associate said third idler floatingly with said movable member, means in connection with said movable member to associate said third idler drivingly between said drive shaft and the other of the pulley surfaces of said second idler when said movable member is moved into said second predetermined position.

2. In a phonograph record player comprising a turntable and a motor, the motor having support arms extending therefrom and a drive shaft, means to operate the turntable at two speeds including a pin carried by one of said arms, a support bracket pivoted on said pin, a carrier member in movable association with said bracket, a first idler wheel rotatably journalled on said carrier member, and resilient means coupled to said carrier member to urge said idler wheel into driving engagement with said turntable and said drive shaft to provide a first speed for the turntable, means to provide a second speed for said turntable including a swingable member in pivotal relationship to the motor, a second idler carried by said swingable member, said second idler including two pulley surfaces differing in diameter, one of said pulley surfaces being adapted to drivingly engage said first idler and to move said first idler out of engagement with said drive shaft when said swingable member is swung from a first to a second predetermined position, a third idler, means to associate said third idler floatingly with said swingable member, means in connection with said swingable member to urge said third idler into idling relationship between said drive shaft and the other of the pulley surfaces of said second idler when said swingable member is swung into said second predetermined position.

3. In a phonograph record player comprising a turntable having a peripheral depending flange and a motor, the motor having support arms extending therefrom and a drive shaft, means to operate the turntable at two speeds including a shouldered pin carried by one of said arms, a support bracket having a hub thereon, said hub being journalled on said pin, a carrier member, means providing for slidable association between said carrier member and said bracket, a resilient surfaced first idler carried by said carrier member, spring means coupled to said carrier member by which said first idler is adapted to be urged in a direction between said drive shaft and said turntable flange to provide concurrent driving engagement therewith and thereby provide one speed for the turntable, means to provide another speed for said turntable including a lever in pivotal relationship to the motor, a second idler carried by said lever, said second idler including two pulley surfaces differing in diameter, one of said pulley surfaces being adapted to engage said first idler drivingly and to move said first idler out of engagement with said drive shaft when said lever is moved from a first to a second predetermined position, a third idler, means to associate said third idler floatingly with said lever, means in connection with said lever to associate said third idler between said drive shaft and the other of the pulley surfaces of said second idler when said lever is moved into said second predetermined position.

4. In a phonograph record player comprising a turntable having a peripheral depending flange and a motor having support arms extending therefrom and a drive shaft, means to operate the turntable at two speeds including a shouldered pin carried by one of said arms, a support bracket, a hub at one end of said bracket journalled on said pin to provide for swingable relationship of said bracket with respect to said pin, a carrier member, a slot in said carrier member, said hub having an annular groove extending through said slot thereby slidably anchoring said carrier member in association with said bracket, bearing surfaces extending longitudinally of said carrier member and adapted to engage said bracket, a second slot in said carrier member, a lug on the other end of said bracket and extending into said second slot to provide operable relationship between said bearing surfaces and said bracket, a pintle on said carrier member, a rubber surfaced first idler wheel journalled on said pintle, a spring anchored to said carrier member to urge said idler wheel into driving engagement between said drive shaft and said turntable flange to provide a first speed for the turntable, means to provide a second speed for said turntable including a lever in pivotal relationship to the motor, a second idler carried by said lever, said second idler having two pulley surfaces differing in diameter, one of said pulley surfaces being adapted to engage said first idler drivingly and to move said first idler out of engagement with said drive shaft when said lever is moved from a first to a second predetermined position, a third idler, means to associate said third idler floatingly with said lever, means in connection with said lever to associate said third idler drivingly between said drive shaft and the other of the pulley surfaces of said second idler when said lever is moved into said second predetermined position.

5. In a phonograph record player comprising a turntable and a motor, having support arms extending therefrom and a drive shaft, means in conjunction with said drive shaft to drive said turntable at two speeds including a first idler, means to associate said first idler floatingly with said motor, means to urge said first idler toward a position between said turntable and said drive shaft to provide a first speed for the turntable, means to provide a second speed for the turntable including a bearing member in rigid relationship to said motor, a swingable member pivoted to said bearing member, latch means in connection with the swingable member to provide first and second predetermined positions therefor, a second idler, a third idler, means by which said third idler is adapted to rotate about an axis with respect to said swingable member, said second idler having a pair of pulley-engaging surfaces differing in diameter and adapted to rotate about an axis fixed with respect to said swingable member, resilient means in communication with said third idler by which it is biased into driving engagement with one of the steps of said second idler, said third idler adapted to be driven by said drive shaft, and said first idler being adapted to be concurrently moved out of engagement with said drive shaft by engagement of the other of the steps of said second idler when carried into engagement with said first idler by movement of said swingable member from its first to its second predetermined position, said second and third idlers being adapted to be moved out of engagement with said shaft and said first idler when said swingable member is returned from its second position to its first position thereby permitting said shaft to be reengaged by said first idler.

6. A phonograph apparatus for reproducing fine and coarse sound grooved records comprising a base plate, a turntable in rotatable relationship thereto, a motor having a drive shaft extending therefrom, arms extending from the motor and means by which the arms are attached to the base plate, means by which said turntable is adapted to be driven at either of two speeds including a first idler, means to floatingly associate said first idler with said motor, means to urge said first idler into concurrent driving relationship with the drive shaft and the turntable to provide one speed for said turntable, means to provide another speed for the turntable including a pintle extending from said motor, a control lever journalled on said pintle, said lever being adapted to be manually swung about said pintle from a point above the base plate, holding means in association with said lever to retain said lever releasably in either of two predetermined positions, a second idler having two pulley engageable steps thereon, a carrier link, a third idler rotatably carried by the carrier link, means by which said carrier link is held in slidable and pivotal relationship to said control lever to associate said third idler with said shaft and said second idler, spring means to bias said third idler into driving engagement with one of the steps of said second idler, said second and third idlers being free from engagement with the drive shaft and the first idler when the control lever is in one of its predetermined positions to provide for driving engagement of said first idler by said drive shaft, movement of said control lever to said second predetermined position being adapted to move said first idler out of driven engagement with said drive shaft by engagement of the other step of said second idler with said first idler and concurrent movement of said third idler into driven engagement with said drive shaft.

7. A phonograph apparatus for reproducing fine and coarse sound grooved records comprising a base plate, a turntable in rotatable relationship thereto, a motor having a drive shaft extending therefrom, arms extending from the motor and means by which the arms are attached to the base plate, means including a shouldered pin carried by one of said arms, a support bracket having a hub at one end thereof journalled on said pin to provide for swingable relationship of said bracket with respect to said pin, a carrier member having a slot therein, said hub having an annular groove extending through said slot, thereby slidably anchoring said carrier member in association with said bracket, bearing surfaces extending longitudinally of said carrier member and adapted to engage said bracket, a second slot in said carrier member, a lug on the other end of said bracket and extending into said slot to provide operable relationship between said bearing surface and said bracket, a pintle on said carrier member, a rubber surfaced first idler wheel journalled on said pintle, a spring anchored to said carrier member to urge said idler wheel away from said shouldered pin and into driving engagement between said drive shaft and said turntable flange to provide a first speed for the turntable, means to provide another speed for the turntable including a second pintle extending from said motor, a control lever journalled on said second pintle, said lever being adapted to be swung about said second pintle manually from a point above the base plate, holding means in association with said lever to retain said lever releasably in either of two predetermined positions, a second idler having two pulleys engageable steps rotatably journalled on said lever, a carrier link, a third idler rotatably carried by the carrier link, means by which said carrier link is held in slidable and pivotal relationship to said control lever to associate said third idler with said shaft and said second idler, spring means to bias said third idler into driving engagement with one of the steps of said second idler, said second and third idlers being free from engagement with the drive shaft and the first idler when the control lever is in one of its predetermined positions to provide for driving engagement of said first idler by said drive shaft, movement of said control lever to said second predetermined position being adapted to move said first idler out of driven engagement with said drive shaft by engagement of the other step of said second idler with said first idler and concurrent movement of said third idler into driven engagement with said drive shaft.

8. A phonograph apparatus for reproducing fine and coarse sound grooved records comprising a base plate, a turntable in rotatable relationship thereto, a motor having a drive shaft extending therefrom, said motor being attached to the base plate, means by which said turntable is adapted to be selectively driven at either of two speeds including a first idler, means to bias said first idler into driving communication with said turntable and said drive shaft to provide a first speed for the turntable, means to provide a second speed for said turntable comprising a control member in movable association with the motor, a train of friction-coupled rotatable elements carried by said control member, said first idler being adapted to remain in driving communication with said turntable but to be moved out of engagement with said shaft by movement of said control member to also provide concurrent driving communication of said train of rotatable elements, drive shaft and first idler.

9. The combination with a phonograph record player comprising a turntable adapted to be driven by means including a floating idler biased into driving engagement with the turntable and a motor having a drive shaft extending therefrom, of means including a control member in movable association with the motor to determine operation of said turntable selectively at either of two speeds, said control member having a pair of spaced apart notches thereon, a spring pressed finger to abut said control member and engage a first of said notches releasably when the idler is concurrently in engagement with said shaft and said turntable thereby providing one speed for the turntable, and a pair of drivingly associated rotatable elements carried by said control member, the elements being in spaced relationship to said shaft and said idler when the first of said notches is engaged by said finger, one of said elements being adapted to be carried into driven engagement with said shaft and simultaneously the other of said elements being carried into driving engagement with said idler to both provide driving association therewith and concurrently move the idler out of driven engagement with the drive shaft on movement of said control member until the second of said notches is engaged by said finger thereby providing a second speed for said turntable.

10. The combination with a phonograph record player comprising a turntable adapted to be driven by means including a floating idler biased into driving engagement with the turntable and a motor having a drive shaft extending therefrom, of means including a control lever in association with the motor to determine selectively the manner in which the idler is adapted to receive motion from said motor, said lever being adapted to be swung about a fulcrum in fixed relationship to said motor, a lateral arm on said lever, said arm being in the form of an arc with the fulcrum as its center and having two spaced-apart notches in the periphery thereof, a spring pressed finger to abut said arm, said idler being concurrently in engagement with said drive shaft and said turntable when a first of the notches is engaged by said finger to provide for a first speed for the turntable, and a pair of drivingly associated rotatable elements carried by said lever, the elements being in spaced relationship to said shaft and said idler when the first of said notches is engaged by said finger, one of said elements being adapted to be carried into driven engagement with said shaft and simultaneously the other of said elements carried into engagement with said idler to both provide driving association therewith and concurrently move the idler out of driven engagement with the drive shaft on movement of said lever until the second of the notches is engaged by said finger thereby providing a second speed for said turntable.

11. The combination with a phonograph record player comprising a turntable adapted to be driven by means including a floating idler biased into driving engagement with the turntable and a motor having a drive shaft extending therefrom, of means including a control member in movable association with the motor to determine selectively the operation of said turntable at either of two speeds, said control member having a pair of spaced apart notches thereon, a spring pressed finger to abut said control member and engage a first of said notches releasably when the idler is concurrently in engagement with said shaft and said turntable thereby providing one speed for the turntable, and a pair of rotatable elements carried by said control member, means providing for rotation of one of said elements about an axis in fixed relationship to said control member, means providing floating support for the other of said elements and means on said control member to bias said last named element into driving engagement with said first named element, the elements being in spaced relationship to said shaft and said idler when the first of said notches is engaged by said finger, one of said elements being adapted to be carried into driven engagement with said shaft and simultaneously the other of said elements being carried into driving engagement with said idler to provide driving association therewith and concurrently move the idler out of driven engagement with the drive shaft on movement of said control member until the second of said notches is engaged by said finger thereby providing a second speed for said turntable.

12. The combination with a phonograph record player comprising a turntable adapted to be driven by means including a floating rubber tired idler biased into driving engagement with the turntable and a motor having a drive shaft extending therefrom, of means including a control lever in association with the motor to determine selectively the speed at which the idler is adapted to receive motion from said motor, said lever being adapted to be swung about a fulcrum in fixed relationship to said motor, a lateral arm on said lever, said arm being in the form of an arc having its center at the fulcrum and having two spaced-apart notches in the periphery thereof, a spring pressed finger to abut said arm, said idler being concurrently in engagement with said drive shaft and said turntable when a first of the notches is engaged by said finger to thereby provide for a first speed for the turntable, a pair of rotatable elements carried by said control lever, one of said elements having a pair of pulley engageable surfaces differing in diameter, means by which one of said elements is adapted to turn about an axis in fixed relationship to said lever, a link, means by which the other of the elements is adapted to turn about an axis in fixed relationship to said link, means by which said link is pivoted to said lever, said means providing for longitudinal motion of said link, and resilient means in coupled relationship to the last mentioned element by which said element is biased into driving relationship with said first mentioned element, the elements being in spaced relationship to said shaft and said idler when the first of said notches is engaged by said finger, one of said elements being adapted to be carried into driven engagement with said shaft and simultaneously the other of said elements carried into engagement with said idler to provide driving association therewith and concurrently move the idler out of driven engagement with the drive shaft on movement of said lever until the second of the notches is engaged by said finger thereby providing a second speed for said turntable.

FRANK R. NUCKOLS.

REFERENCES CITED

The following references are of record in the file of this patent:

UNITED STATES PATENTS

| Number | Name | Date |
|---|---|---|
| 651,656 | Durr | June 12, 1909 |
| 1,591,494 | Lanchester | July 6, 1926 |
| 2,438,265 | Metzner | Mar. 23, 1948 |